UNITED STATES PATENT OFFICE.

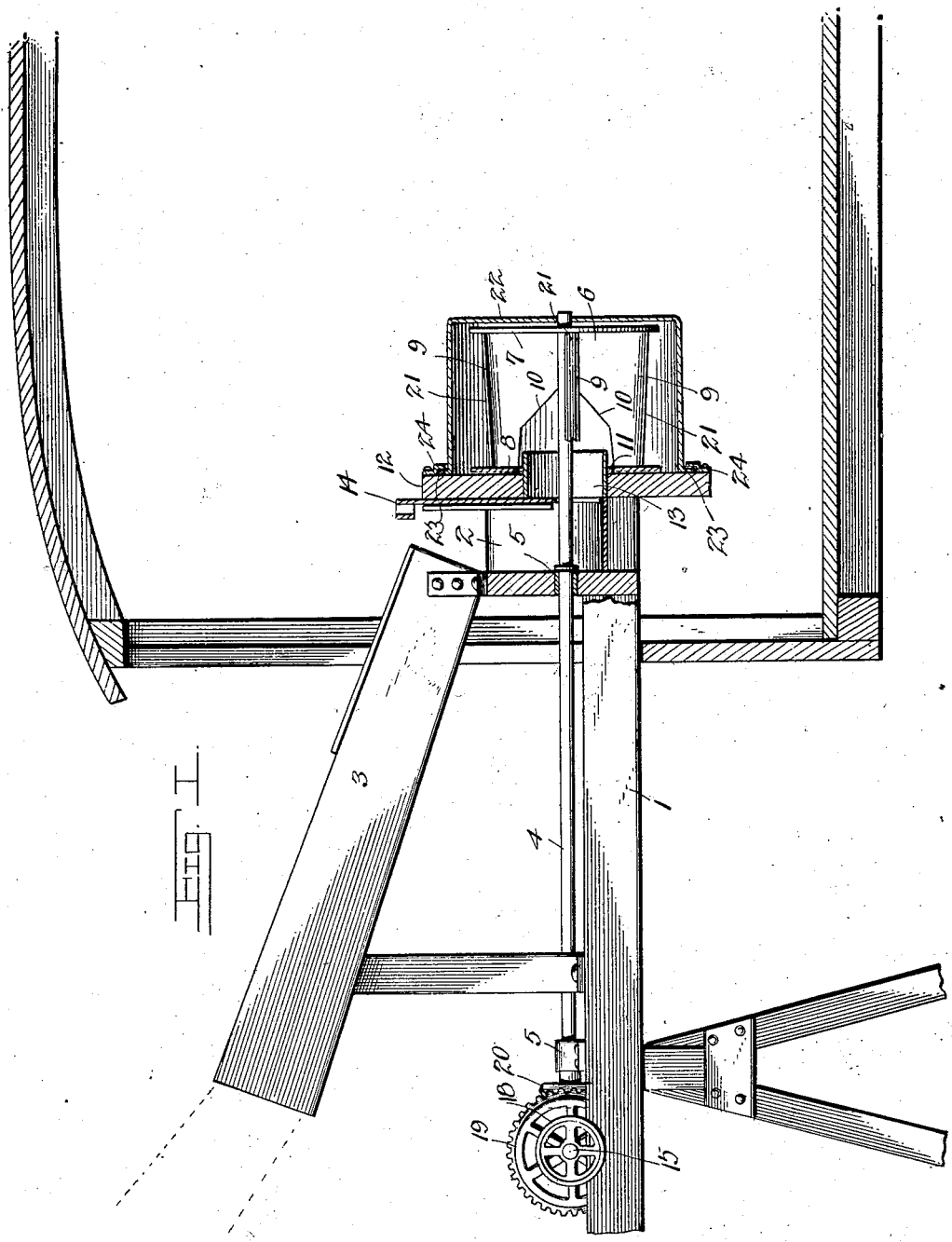

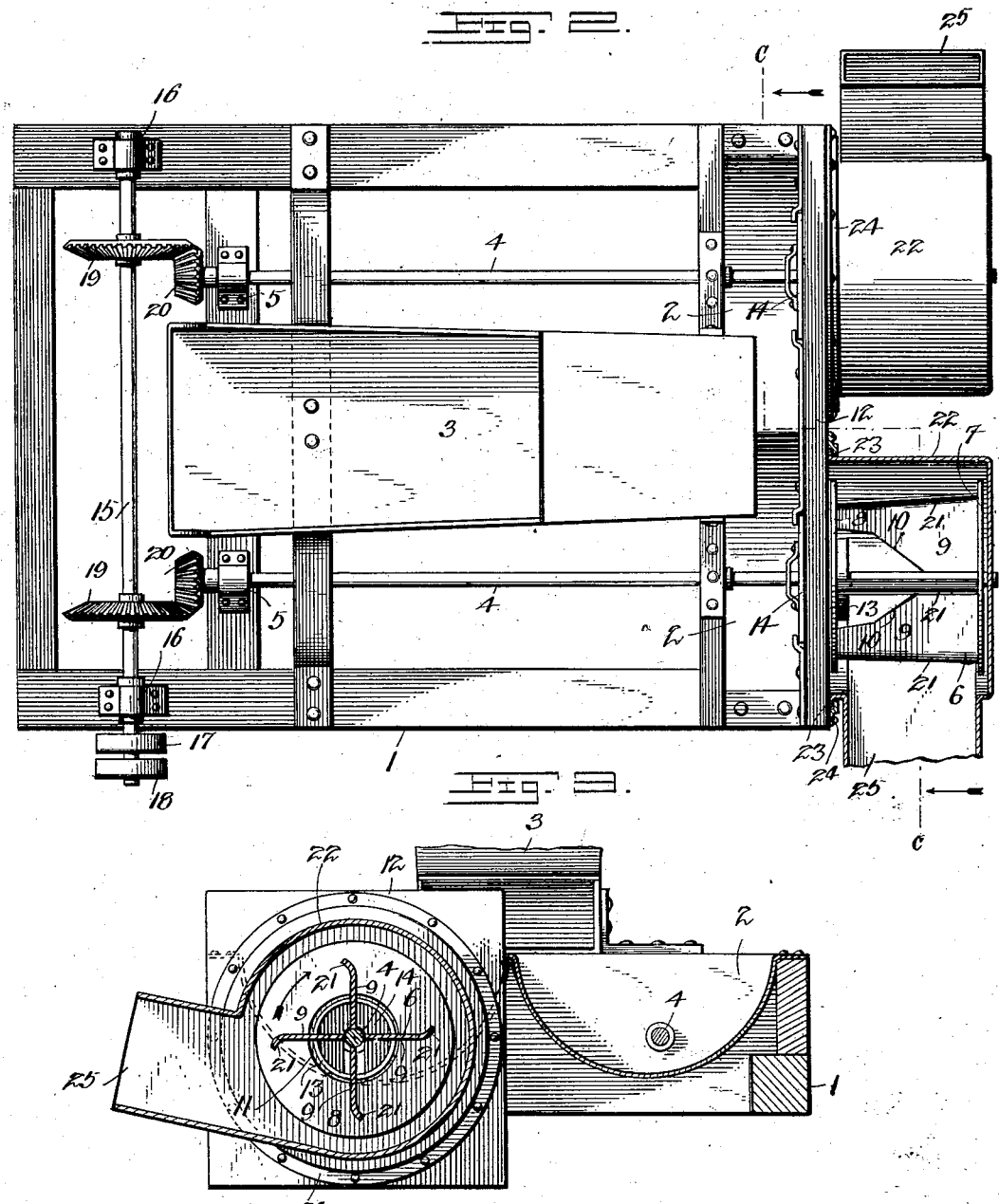

JAMES L. ROBERTS, OF PONTIAC, ILLINOIS.

CAR-LOADER.

SPECIFICATION forming part of Letters Patent No. 703,473, dated July 1, 1902.

Application filed September 20, 1901. Serial No. 75,896. (No model.)

*To all whom it may concern:*

Be it known that I, JAMES L. ROBERTS, a citizen of the United States, residing at Pontiac, in the county of Livingston and State of Illinois, have invented a new and useful Car-Loader, of which the following is a specification.

My invention is an improved car-loader, the object of my invention being to provide novel means for loading grain-cars, vessels, and the like from elevators, whereby the grain may be simultaneously and uniformly thrown to opposite ends of the car or hold of the vessel and uniformly distributed therein.

My invention consists in the peculiar construction and combination and devices hereinafter set forth, and pointed out in the claims.

In the accompanying drawings, Figure 1 is a side elevation of a car-loader constructed in accordance with my invention and partly a sectional view of the same, the car-loader being shown arranged in operative position in a car. Fig. 2 is a top plan view of my improved car-loader, partly in section. Fig. 3 is a transverse section of the same, taken on a plane indicated by the line *c c* of Fig. 2.

The supporting-frame 1 of my improved car-loader is here shown as of rectangular form and is of any suitable size and construction. At one end thereof, which I will call the "inner" end, are a pair of hoppers 2, which are disposed side by side and which extend transversely across the said frame 1. On the latter in the center thereof is supported a longitudinally-disposed inclined chute 3, the lower end of which is disposed over the meeting sides of the hoppers 2, the said chute being adapted to discharge into the said hoppers. In operation grain is supplied to the said chute from an elevation or bin by gravity. Within the scope of my invention, however, the grain may be fed to the chute or to the hoppers in any suitable manner and by any suitable means.

A pair of shafts 4 are journaled in suitable bearings 5, the said shafts being disposed longitudinally on the frame 1. The said shafts extend through the hoppers 2 at points at or near the centers of the hoppers and are provided at their ends which project beyond the inner end of the frame 1 with revoluble shovels 6, each of which comprises an outer head 7, an inner head 8, and a suitable number of radially-disposed blades 9. The latter have their inner corners cut away at their inner ends to form openings 10 around the shafts 4, and the heads 8 are provided with central circular openings 11. The outer side walls 12 of the hoppers are provided with spouts 13, which are preferably cylindrical in form, and the said spouts project through the openings 11 and enter the openings 10. The latter enable the grain to be readily discharged from the hoppers through the spouts 13. The hoppers are further provided with vertically-movable gates 14, which operate on the inner ends of the spouts 13 and may be adjusted to open the said spouts to any desired extent or to entirely close the same to cut off the discharge of grain from the hoppers through the spouts, as will be understood.

In operation the shovels are revolved simultaneously in opposite directions, and any suitable means may within the scope of my invention be employed to rotate the said shovels. I show a power-shaft 15, which is journaled transversely with relation to the frame 1 and in bearings 16. The said shaft 15 has a fast pulley 17, a loose pulley 18, and is provided with beveled gear-wheels 19, which latter engage similar pinions 20 on the shafts 4.

The blades 9 of the revoluble shovels are curved or deflected at their outer portions, as at 21, to increase the efficiency of the said blades in throwing the grain centrifugally therefrom. The said revoluble shovels operate in hoods 22, which are cylindrical in form and are closed at their outer ends. The said hoods are disposed on the outer sides of the hoppers and are provided with circular flanges 23, which are engaged by annular flanged plates 24, which are bolted or otherwise suitably secured on the hoppers. By this construction the hoods are adapted to be turned so as to dispose the discharge-spouts 25 thereof at any desired angle, according to the distance which it is necessary to throw the grain from the shovels in order to properly load the car or vessel with the grain. It will be understood by reference to Fig. 3 of the drawings that the said spouts 25 of the hoods are at the lower sides of the latter and eccentrically disposed with reference to the revoluble shovels.

It will be noted that the hoppers discharge the grain through the spouts 13 at the centers of the revoluble shovels, and hence the grain as it falls from the said spouts is caught and thrown centrifugally by the revolving blades of the shovels, and the grain is fed evenly to all of the blades of the shovels, thus securing uniformity in the operation thereof. The deflected outer portions of the blades enable the latter to readily clear the grain as the grain moves centrifugally on the said blades.

Having thus described my invention, I claim—

1. In a car-loader of the class described, the combination of a hopper having a discharge-opening in one side, a revolubly-adjustable hood on said side of the hopper, opposite said discharge-opening, said hood having a circular flange bearing against the side of the hopper and provided further with a discharge-spout, an annular flange on the side of the hopper and engaging the flange of the hood, thereby adjustably connecting the latter to the hopper, and a revoluble shovel in said hood, substantially as described.

2. In a car-loader, of the class described, the combination of a revoluble shovel having blades provided with openings 10 at their inner corners and discharging means having a spout projecting into the said openings in said blades, substantially as described.

3. In a car-loader of the class described the combination of a hopper or the like grain-discharging means having a projecting spout, and a revoluble shovel comprising a pair of heads and blades connecting the said heads, one of said heads having an opening through which said spout extends and revolving around the said spout, substantially as described.

In testimony that I claim the foregoing as my own I have hereto affixed my signature in the presence of two witnesses.

JAMES L. ROBERTS.

Witnesses:
  CLEMETH J. COX,
  JOHN NEIFING.